(12) United States Patent
Artigalas et al.

(10) Patent No.: US 6,654,540 B2
(45) Date of Patent: Nov. 25, 2003

(54) METHOD AND DEVICE FOR RECORDING AND READING ON A LARGE-CAPACITY MEDIUM

(75) Inventors: Max Artigalas, Le Chesnay (FR); Paul-Louis Meunier, Paris (FR); Alain Staron, Paris (FR)

(73) Assignee: Thomson Licensing, S.A., Boulogne-Billancourt (FR)

( * ) Notice: Subject to any disclaimer, the term of this patent is extended or adjusted under 35 U.S.C. 154(b) by 0 days.

(21) Appl. No.: 09/498,566

(22) Filed: Feb. 4, 2000

(65) Prior Publication Data

US 2001/0014206 A1 Aug. 16, 2001

Related U.S. Application Data

(62) Division of application No. 08/675,364, filed on Jul. 2, 1996, now Pat. No. 6,091,883.

(30) Foreign Application Priority Data

Jul. 2, 1996 (FR) .............................................. 95 08558

(51) Int. Cl.[7] .............................. H04N 5/91; H04N 7/00
(52) U.S. Cl. .......................................... 386/83; 386/46
(58) Field of Search ................................. 386/109, 111, 386/112, 83, 92, 46, 52, 1, 4, 27, 33, 95, 96, 104, 39, 40, 94; 360/32; 725/87, 88, 101, 102

(56) References Cited

U.S. PATENT DOCUMENTS

| 4,977,455 | A | * | 12/1990 | Young ........................ 386/83 |
| 5,187,589 | A | * | 2/1993 | Kono et al. |
| 5,377,051 | A | * | 12/1994 | Lane et al. .................. 386/109 |
| 5,434,678 | A | * | 7/1995 | Abecassis .................... 386/125 |
| 5,442,390 | A | * | 8/1995 | Hooper et al. ................ 386/83 |
| 5,479,302 | A | * | 12/1995 | Haines ........................ 360/69 |
| 6,055,314 | A | * | 4/2000 | Spies et al. |

* cited by examiner

*Primary Examiner*—Robert Chevalier
(74) *Attorney, Agent, or Firm*—Joseph S. Tripoli; Reitseng Lin

(57) ABSTRACT

The disclosure relates to a recording and reading apparatus constituting a kind of video reservoir in the home of the consumer. Thanks to a large-capacity storing technique with suitable technical means, broadcasters transmit numerous programs via specific channels and the consumer may control the content of his reservoir (by recording, reading and erasing programs). The invention is applicable to on-demand video in the consumer's home with a video reservoir constituting a video-library that is regularly updated by broadcasters and/or by the consumer himself.

10 Claims, 3 Drawing Sheets

METHOD AND DEVICE FOR RECORDING AND READING ON A LARGE-CAPACITY MEDIUM

CROSS REFERENCE TO RELATED APPLICATIONS

Division of application Ser. No. 08/675,364 filed Jul. 2, 1996, (now U.S. Pat. No. 6,091,883).

BACKGROUND OF THE INVENTION

The present invention concerns a method and a device for recording and reading audio and/or video information broadcast as individual programs on one or more channels by air broadcasting, satellite or cabled network.

DESCRIPTION OF THE PRIOR ART

Recent developments of the audiovisual techniques have led, in a number of countries, to a choice of TV programs exceeding the viewers' capacity to view all the programs of interest. This is particularly noticeable in countries having satellite TV, notably providing digital transmissions, and cable networks. In practice a TV viewer watches only one channel at a time, possibly recording another program on his video cassette recorder (VCR) at the same time.

A problem arises when the viewer is interested in several programs broadcast at the same time or when several members of his family with different tastes share the same TV set. To resolve this problem, one solution would be simply to acquire more TVs and VCRs, but this solution is costly and the correction and use of several recorders in parallel can be problematic.

A viewer may also wish to record a number of TV programs when he is not watching the television (during the day when he is at work, or during the night). The present solution is to program the video recorder to record sequentially in time a number of programs selected in advance. However, a problem arises if the programs are not broadcast at the time announced; there is also the problem of the limited recording capacity (a few hours at most) of present video cassettes. These constraints seriously limit the freedom of the user to record programs of interest.

In parallel with a rapid increase in the number of TV channels broadcast live, a number of supplementary services are now offered. For example, "on-demand video" services enables the consumer to select a movie in a server system that then starts sending the program to the user in exchange for a payment. Such a system requires a server of large-capacity and a wide band network in order to be able to respond to simultaneous requests for different movies from a large number of consumers. The consumer is totally dependent on the state of operation of the network and the catalogue of the movies offered by the server.

SUMMARY OF THE INVENTION

The present invention proposes a technique that enables a consumer to have a large-capacity recording device at home to in order to be able to build a personal video and/or audio library.

Another object of the invention is to offer the consumer a genuine on-demand video service in which he totally controls the selection and display of the programs from his own video reservoir.

Another object of the invention is to enable the program supplier to assure the revenues generated by his programs by controlling the access to video and/or audio programs recorded consumer's recording device, and/or by encrypting the broadcast programs.

Another object of the invention is to enable the consumer to control access to his video and/or audio reservoir by means of a personal access code, and/or limit his expenditure on decoding of certain of the recorded programs by choosing only to display or listen to program of interest.

Another object of the invention is to enable the consumer to constitute a video or audio library in his recording device whose content is controlled by the consumer.

Another object of the invention is to offer a video and/or audio reservoir whose content is regularly updated by the broadcasters, the consumer being able to watch recorded programs during the update of the content of his video and/or audio reservoir.

The invention is therefore a method of recording and reading audio and/or video information broadcast as individual programs via one or several channels by air broadcasting, satellite or cable network. The method comprises the following steps:

- select at least one channel to receive;
- digitally encode the received signals;
- record the encoded digital signals on a large-capacity recording medium;
- create an index on the recording medium for each individual program recorded;
- create at least one menu of recorded programs;
- select one or several programs from a menu of recorded programs displayed on a screen;
- read said selected program(s);
- decoding the signals read;
- reproduce the corresponding audio and/or video information.

The received signals may be either analog or digital. In case of analog signals received, an analog to digital conversion is done.

The method can include an access control stage to enable reading of at least one of the recorded programs. The use of one or more access codes enables access to the recorded programs to be modulated by applying criteria defined by broadcasters and by the consumer. In this way the broadcasters can control the access to certain types of programs, and modulate the amount of the subscription that the consumer must pay to obtain access to these programs. The same applies when several broadcasters offer programs with different subscriptions from one broadcaster to another. On the user side, the access code enables him to totally prevent other persons from accessing the service, or prevent children accessing programs intended only for adults.

The method of the invention also provides the possibility of recording encoded programs and decoding them during the reading by means of a specific code, in order to reproduce the sound or images. Such as service enables the consumer to control his expenditure on decoding of certain of the recorded programs. The specific code could be the number of his bank card or credit card, so that he pays each time he wishes to decode a program.

The recording and reading functions are advantageously independent of each other, in order to allow reading of one or more recorded programs while recording other programs. The consumer is then able to update the content of his video and/or audio reservoir at any time.

The method preferably enables programs designated by the user to be locked, so that they can not be erased. In this way the user can build up a personal collection of protected recordings. To delete one of the recordings, the user must first unlock it, then erase it from the recording medium.

Advantageously, the method enables simultaneous recording and/or reading of several programs in order to enable the user more rapid updating of his video and/or audio reservoir, and greater flexibility in the restitution of recorded programs, for example by using several televisions sets in parallel to display several recorded programs at the same time. The same applies for audio programs. Several members of the family can then view or listen to the recorded programs independently in different rooms.

The invention also includes a recording and reading device, referred to as a "video and/or audio reservoir", implementing the method according to the invention, this device including:

means of reception frequency selection enabling reception of one or more broadcasting channels simultaneously;

means of digital encoding of the received signals;

means of recording and reading said encoded digital signals;

means of control enabling the recording and reading of programs to be controlled independently;

means of processing the signals read in order to reproduce the sound and/or image (possibly with the ability to read and reproduce in parallel several recorded programs, simultaneously and independently from one another).

Said means of recording and reading must include a large-capacity recording medium in order to enable a "reservoir" to be constituted. The reservoir must be capable of storing a large number of video and/or audio programs (music, news, conferences, etc.).

The French patents N°2 630 853, N°2 656 723 and N°2 699 724 describe a technique of recording and reading on a magnetic tape that enables the storage of a large amount of information. Schematically, the technique uses a magnetic tape that moves over a static magnetic recording head composed of a matrix of N×M individual recording elements ($N \geq 2$ and $M \geq 1$). By using protocols of excitation of the individual recording elements it is possible to record up to N parallel tracks of information. For the reading of the magnetic tape, a static magneto-optical head enables polarized light to be projected on the magnetic tape which, by the Kerr effect changes the optical polarization when it is reflected from the magnetic tape as a function of the magnetic polarization of the illuminated tracks. A sensor converts the reflected polarized light into a stream of binary numbers representing the data recorded on the N parallel tracks. The patents mentioned above contain more detail of the technique concerned which, by use of the matrix head, enables recording and reading on N parallel tracks on the magnetic tape, simultaneous, independent recording and reading of several programs, and increase of the storage capacity of a 8 mm magnetic tape cassette up to about a hundred hours of video programs.

It is also possible to use the technique of the digital video cassette to build the video and/or audio reservoir. The technique consists in recording and reading information on a magnetic tape by means of a rotating head. Using digital compression, the cassette is capable of storing up to several tens of hours of video programs. Given that the recording and reading data rate on the cassette is several times greater than the broadcasting rate of video programs on a channel (1 to 8 Mbits/s), it is possible to envisage the recording in parallel of several programs by means of a special multiplexing protocol, and the reading of these programs in parallel by means of a demultiplexing protocol. The user can then view one or more programs that are read in parallel.

BRIEF DESCRIPTION OF THE DRAWINGS

The invention will be better understood and other advantages and characteristics will become clear on reading the following detailed description of an embodiment, taken only as a non-limitative example, making reference to the appended figures, of which:

The device of the invention can be incorporated in a television decoder or in a television receiver. As shown in FIG. 1, the device of the invention includes means of frequency selection 1 able to provide signals from one or more channels in parallel, the channels being picked up by an antenna 2 in the case of an air or satellite broadcast or received via a cable network Said means of frequency selection 1 can includes one or more analog and/or digital "tuners", in order to provide several channels of programs in parallel. The signals output by said means of frequency selection I are processed by means of digital encoding 3 which convert, if need be, the analog signals into digital signals and possibly assure the digital compression and/or multiplexing of the received signals. The encoded digital signals are then fed to the means of recording and reading 4 to be recorded on a large-capacity recording medium 4a. Means of control 5 along with a user interface module 6 (in the form of buttons integrated in the device or a remote controller) enable the user to control the means of frequency selection 1 and the means of recording and reading 4.

Figure 1:
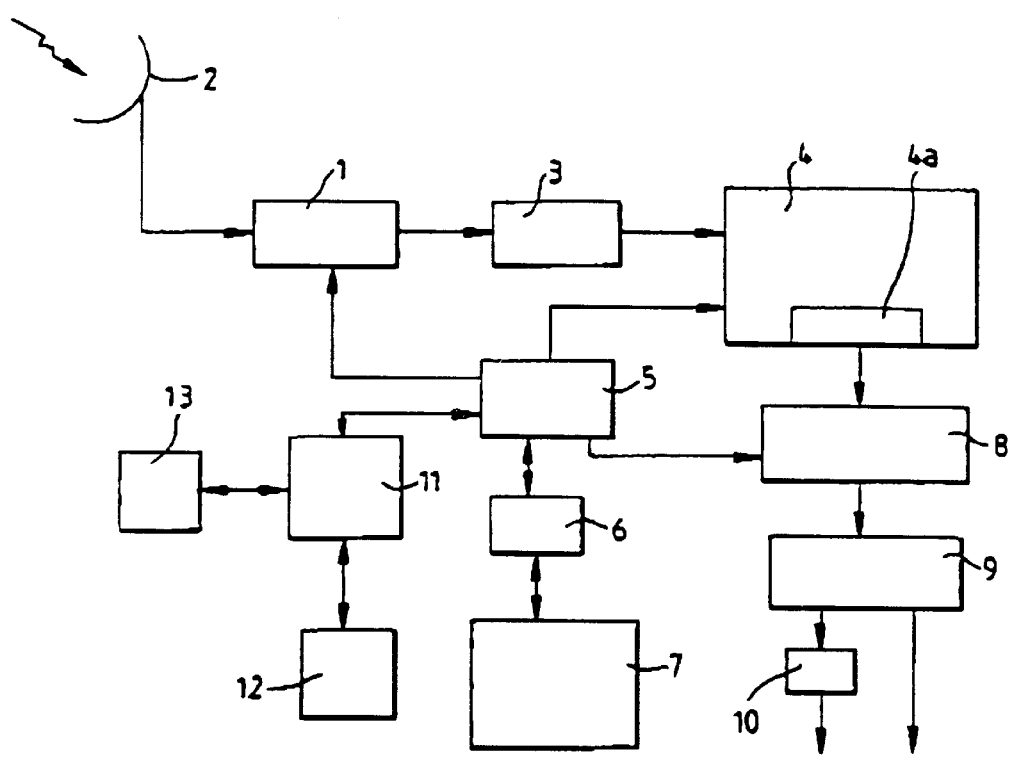
FIG. 1 is of a general block diagram of a audio and/or video recording and reading device according to the invention.

As indicated previously, the means of recording and reading 4 can use the matrix-head magnetic recording technique or the techniques of digital video cassettes (in which case the means of digital encoding 3 also assure the multiplexing if two or more channels are to be recorded in parallel on the recording medium 4a).

The means of control 5 enable the creation of an index of the recorded programs on the recording medium 4a to be created, along with one or more menus of the recorded programs. Using a display screen 7, the user can consult the menu(s) of the recorded programs and interact with the means of control 5 via the user interface module 6. Means of decoding 8 are included to enable the decoding of programs broadcast and recorded on the recording medium 4a in encoded form, the decoding command being sent by the means of control 5. The reading signals are processed digitally by means of digital decoding 9 that perform the decompression and/or demultiplexing in order to reproduce the separate programs in parallel. The signals from the means of digital decoding 9 can be digital or converted into analog by means of a digital-to-analog converter 10 in order to reproduction the corresponding program(s) using appropriate devices (television receivers, hi-fi sets, etc.).

The means of control 5 provide the "fast forward", "fast rewind", "pause", "stop", "fast read", etc. functions during reading of a recorded program. The recording medium 4a is advantageously in the form of cassette that: is removable from the means of recording and reading 4. It is also possible to manage several cassettes as the recording medium 4a in the means of recording and reading 4 in order to further increase the storage capacity of the device.

The means of control 5 can include an access control unit by which the authorization of reading of certain of the recorded programs is given only if one or more access codes entered by the user via the user interface module 6 are correct. The display screen 7 can be the screen of a television to which is connected or in which is incorporated the recording and reading device. We could also make the recording and reading device with the screen 7 built-in. In this case, the screen 7 could be of touch-sensitive type so that the user can interact with the means of control 5 by pressing on the screen (the user interface module 6 being in this case combined with the display screen 7). The touch-sensitive screen 7 can be of liquid crystal type.

The device can include a payment management module 11 linked to a smartcard reader 12, a modem 13 and the means of control 5. When the user wishes to watch a coded program, he inputs a specific code which is stored, for example, on his bank card read by the smartcard reader 12. The payment management module 11 then calls the server center (not shown in the figure) via the modem 13 in order to validate this financial transaction. The payment management module 11 informs the means of control 5 of this validation so that it can start the decoding of the program by the means 8. The user can then watch the corresponding decoded program.

Figure 2A:
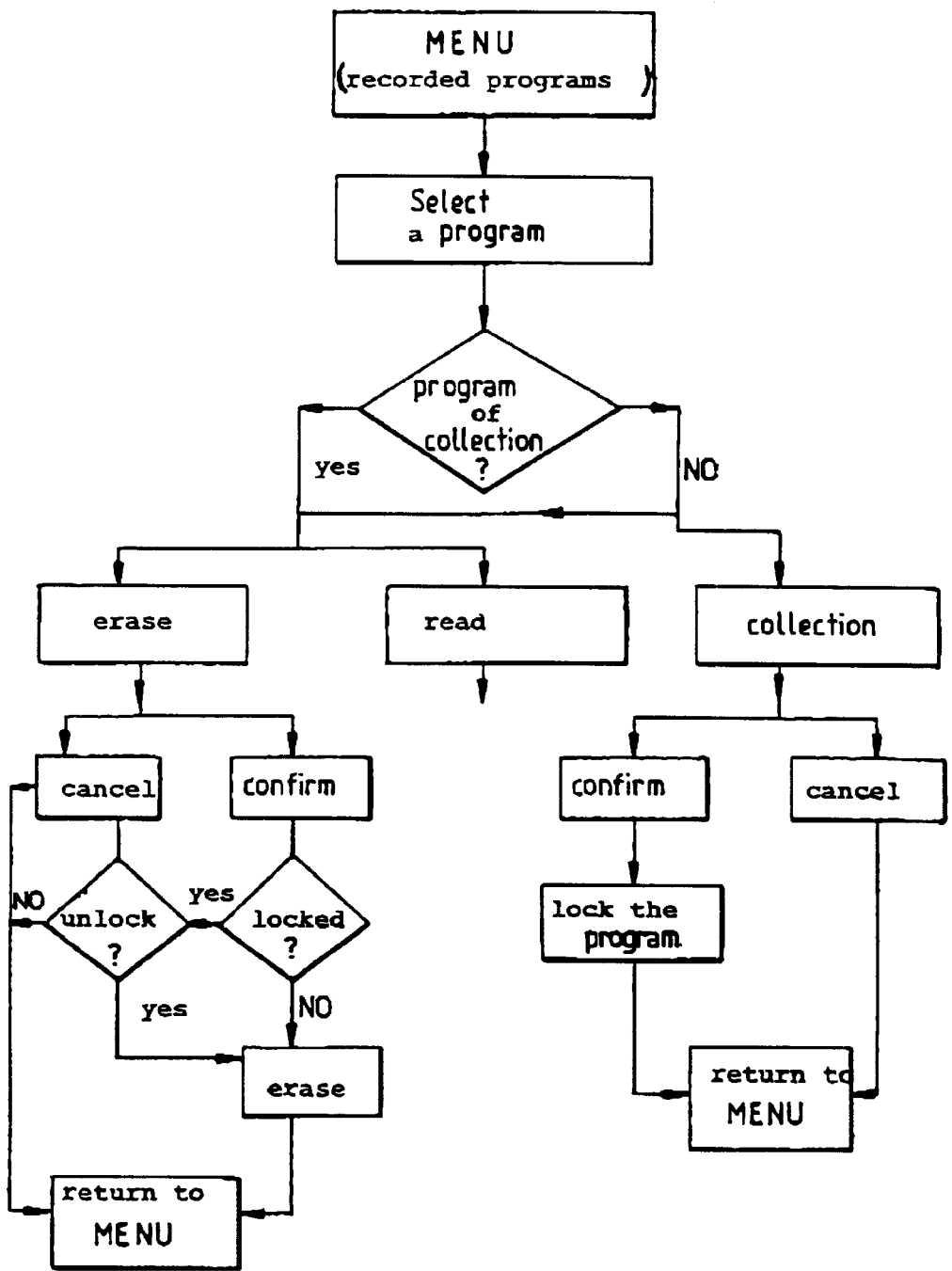
FIGS. 2A and 2B show schematically the interventions of the user to manage the content of the recording medium of the device of FIG. 1.
Figure 2B:
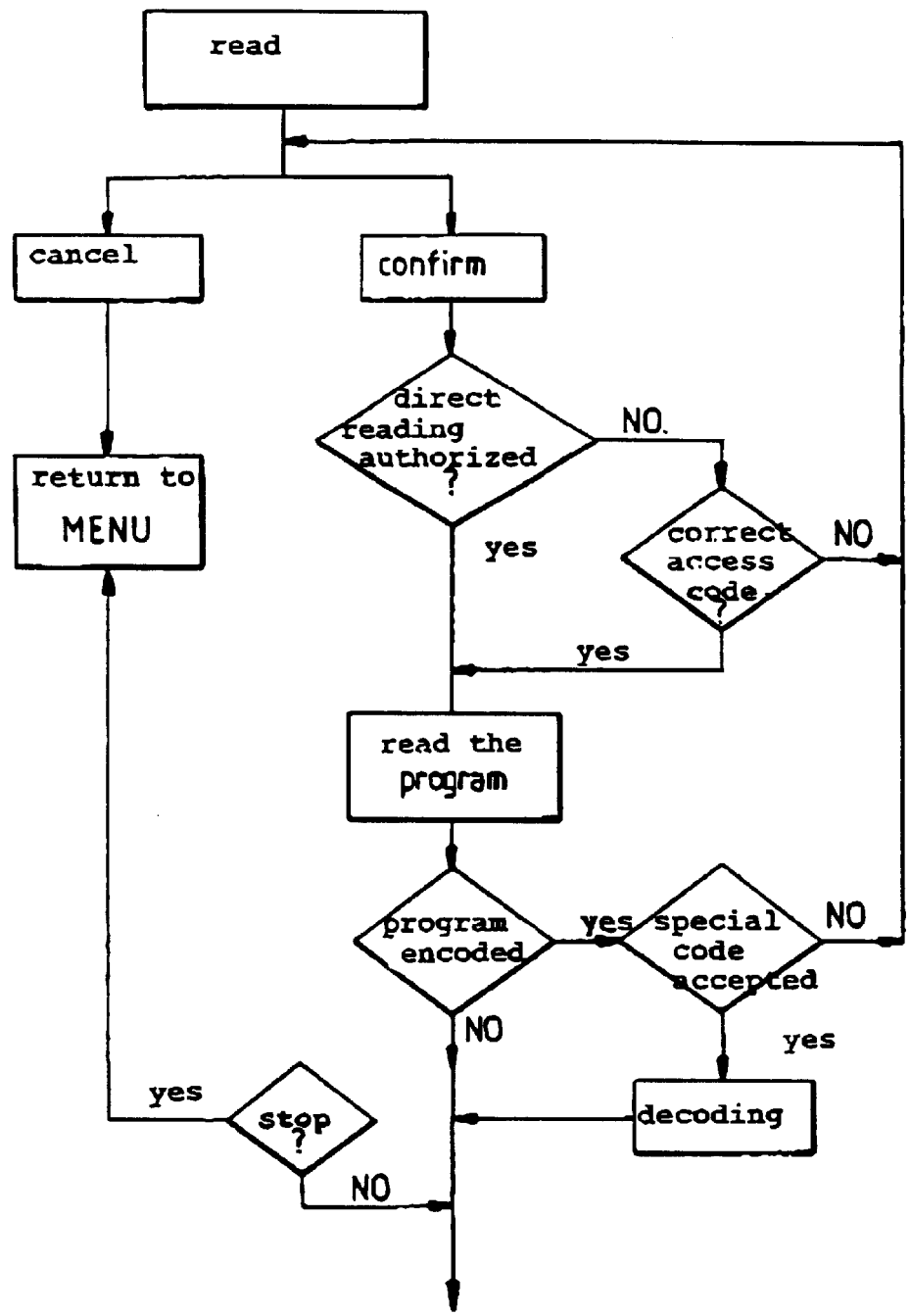

In the example shown in FIGS. 2A and 2B, a menu of the recorded programs is displayed on the display screen 7. It is obviously possible to have several menus of the recorded programs, for example organized by themes (sport, politics, movies, drama, etc.) or by type (for the movies, for example: action, romance, police, etc.). By means of the user interface module 6, the user can select a particular program in the menu.

The means of control 5 then check whether the users private collection includes the selected program (in which case the program is protected by a locking key).

If so, (the program is already locked), the next screen then displays two options: "erase" and "read". If it is not locked, the next screen includes these two options plus a third, "collection", which enables the user to add this program to his private collection by associating a locking key via the means of control 5.

If the option "erase" is chosen, the next screen requests the user to "confirm" or "cancel" the option (in case "erase" was chosen in error). If the user selected "cancel", the system returns to the program selection screen. If the user opts for "confirm", the device erases the program if it is not locked by a locking key. If it is locked, the user can still delete the program but must first unlocked the program via the means of control 5, or he can decide not to erase the program after all. The system then returns to the initial menu.

If the "collection" option is chosen, the next screen proposes two further options: "confirm" and "cancel". When the user confirms the "collection" option, the means of control 5 assign a locking key to the program in order to prevent its direct erasure. The system then returns to the initial menu. If the option "cancel" is chosen, the system simply returns to the initial menu.

If the "read" option is chosen (FIG. 2B). the next screen also proposes two options: "cancel" and "confirm". If the user chooses "cancel", the system returns to the initial menu. If the user chooses "confirm", the means of control 5 check whether direct reading of the selected program is authorized. If so, the program is then read; otherwise the user must enter a correct access code before the reading can start. In the event that the access code is not accepted, the system returns to the screen proposing the suboptions "confirm" and "cancel" of the "read" option. If the program is encoded, the user will notice this and enter a special code (for example, using a bank card) which, after verification, will enable the decoding of the program. If the specific code is not accepted, the system returns to the screen proposing the sub-options "confirm" and "cancel" of the "read" option. If the user stops the reading process via the user interface module 6, the system returns to the initial menu.

Among the possible applications of the invention, we can mention the constitution of a personal video and/or audio library providing the user with an authentic on-demand video and/or audio system made up of the recorded programs.

For the video library application with the use of matrix-head magnetic recording technology (which enables several tens of movies to be recorded on an 8 mm cassette), we could envisage for example the following service with a video reservoir containing up to 50 movies: on the first day of use, the 50 movies known to be the most popular (the "Top 50") are broadcast (using 4 parallel channels or a satellite transponder) and stored in the recording and reading device of the invention. The recorded movies are in encoded form to enables the broadcaster to control the mode of payment for viewing the movies (payment per film, per day, etc.). In other words, the movies are stored at the consumer's home but not yet paid for to be viewed in decoded form. The user can then view immediately any movie among the 50 recorded once he has paid the decoding fee.

He can view the film using the functions such as fast forward, fast rewind, pause, stop, and so on, as with a VCR. The user can build a personal collection of movies in the video reservoir by protecting them using a locking key. Each time a movie is broadcast, one of the 50 movies stored in the video reservoir, excluding the personal collection, will be erased and the new one uses the space liberated. In this way the service provider regularly updates the Top 50 movies and sends an updated list weekly or monthly to the subscribers.

The service proposed can also broadcast other movies (1,000 movies, for example, representing 20 days of broadcasting over 4 channels or a transponder) in order to enable users to build their own video libraries taking into account their personal preferences. For example, a user's video reservoir may comprise the "Top 20" movies, regularly updated, plus a personal collection of 10 of his favorite movies for each of three different themes (adventure, science-fiction, drama).

Another application of the invention would be to enable a user to build an audio library from his audio reservoir. An electronic downloading service for music can be provided via a transponder (24 Mbits/s), for example, capable of transmitting the content of a compact disk (150 Mbytes) in 50 seconds. This means that the transponder is capable of delivering the musical equivalent of more than 1,700 compact disks per day. With a storage capacity of 60 gigabytes, the audio reservoir could hold the equivalent of 400 compact disks at all times. The updating of the content of the reservoir can be controlled by the user.

What is claimed is:

1. A method for constituting a personal multimedia datafile library, comprising:

downloading from one server, through a network, a first plurality of multimedia datafiles;

storing the first plurality of multimedia datafiles on a personal data carrier;

selecting a determined datafile among the stored multimedia datafiles;

enabling a payment mechanism to pay for the determined datafile so as to exploit a content of the determined datafile.

2. The method according to claim 1 further comprising locking the determined datafile such as to prevent the determined datafile to be erased from the data carrier.

3. The method according to claim 1 further comprising downloading a second plurality of multimedia datafiles, and storing the second plurality of multimedia datafiles on the data carrier.

4. The method according to claim 3 further comprising:

selecting an erasable multimedia datafile among the multimedia datafiles stored on the data carrier; and erasing the selected erasable multimedia datafile prior to storing the second plurality of multimedia datafiles.

5. The method according to claim 3, wherein the storing of the first and the second plurality of multimedia datafiles is operated simultaneously.

6. Device for constituting a personal multimedia datafile library, comprising:

means of reception frequency selection enabling reception of one or more broadcasting channels simultaneously;

means of recording and reading a plurality of multimedia datafiles received through the broadcasting channels, including a data carrier and a writing head allowing to record received multimedia datafiles;

means for selection for selecting a determined multimedia datafile among the plurality of multimedia datafiles recorded on the data carrier;

means of payment for enabling a payment for the determined multimedia datafile; and means of exploitation to exploit and or perform reading of a content of the determined datafile.

7. A device for constituting a personal multimedia datafile library according to claim 6 wherein the means of recording and reading multimedia datafiles comprises:

a recording medium in the form of at least one magnetic tape with N longitudinal parallel tracks (N=2);

a magnetic recording head composed of N×M recording elements (M=1); and a magneto-optic read head capable of reading the N tracks simultaneoysly.

8. The device for constituting a personal multimedia datafile library according to claim 7, further comprising:

means of control enabling the recording and reading of programs to be controlled independently.

9. The device for constituting a personal multimedia datafile library according to claim 6, wherein:

the means of payment comprises means of access control to enable reading of the determined datafile after identification of an access code.

10. The device for constituting a personal multimedia datafile according to claim 6, wherein:

the means of payment comprises a locking key generator to prevent a direct erasure of the recorded determined datafile.

* * * * *